United States Patent
Lin et al.

(10) Patent No.: US 11,415,459 B2
(45) Date of Patent: Aug. 16, 2022

(54) PHOTOSENSOR DEVICE WITH DARK CURRENT CANCELLATION

(71) Applicant: Luxsentek Microelectronics Corp., New Taipei (TW)

(72) Inventors: Chih-Wei Lin, New Taipei (TW); Chen-Hua Hsi, New Taipei (TW)

(73) Assignee: LUXSENTEK MICROELECTRONICS CORP., New Taipei (TW)

( * ) Notice: Subject to any disclaimer, the term of this patent is extended or adjusted under 35 U.S.C. 154(b) by 0 days.

(21) Appl. No.: 17/196,347

(22) Filed: Mar. 9, 2021

(65) Prior Publication Data

US 2022/0205839 A1 Jun. 30, 2022

(30) Foreign Application Priority Data

Dec. 24, 2020 (TW) .................................. 109145931

(51) Int. Cl.
*G01J 1/44* (2006.01)
(52) U.S. Cl.
CPC ........... *G01J 1/44* (2013.01); *G01J 2001/444* (2013.01)
(58) Field of Classification Search
CPC .............................. G01J 1/44; G01J 2001/444
See application file for complete search history.

(56) References Cited

U.S. PATENT DOCUMENTS

| 2004/0099920 | A1* | 5/2004 | Rossi | H04N 5/361 |
| | | | | 257/448 |
| 2005/0200732 | A1* | 9/2005 | Tan | H04N 5/361 |
| | | | | 348/243 |
| 2015/0103865 | A1* | 4/2015 | Yano | G06K 15/1247 |
| | | | | 374/161 |
| 2015/0280668 | A1* | 10/2015 | Huang | H03G 3/008 |
| | | | | 330/254 |
| 2016/0011817 | A1* | 1/2016 | Yin | G06F 3/0608 |
| | | | | 711/154 |
| 2016/0377483 | A1* | 12/2016 | Oh | G01J 3/50 |
| | | | | 356/416 |
| 2017/0299649 | A1* | 10/2017 | Coyne | G01R 31/2874 |
| 2018/0266879 | A1* | 9/2018 | Lee | G01J 1/0228 |

* cited by examiner

*Primary Examiner* — Thanh Luu
*Assistant Examiner* — Monica T Taba
(74) *Attorney, Agent, or Firm* — Muncy, Geissler, Olds & Lowe, P.C.

(57) ABSTRACT

The present invention provides a photosensor device, which can cancel a dark current in 1-2 milliseconds. This photosensor device utilizes a small capacitor to quickly accumulate and transform the dark current to a dark-current voltage. Based on the dark-current voltage and an environment temperature, a calibration voltage can be obtained. By cancelling the calibration voltage from the sensed voltage to get a light voltage, which can be amplified to a lux signal. The process is very quick and sensitive, so the photosensor device can be used in an environment under a low luminance.

12 Claims, 3 Drawing Sheets

PHOTOSENSOR DEVICE WITH DARK CURRENT CANCELLATION

BACKGROUND OF THE INVENTION

1. Field of the Invention

The present invention relates to a photosensor device with eliminating dark current, in particular relates to the photosensor device can cancel dark current very fast and precise.

2. Description of the Prior Art

The photosensor usually uses a photodiode to convert a light signal into an electrical signal. However, a leakage current not caused by the light occurs in the photodiode, called dark current. The dark current distorts the sensing result of the photosensor.

For eliminating dark current, two photodiodes are equipped usually, one is illuminated for sensing light and the other is not illuminated for measuring dark current. The correct sensing signal can be obtained by cancelling out the dark current signal from the total electrical signal.

Dark current is caused mainly by ambient temperature and affected by sensing area, manufacturing process and so on, but each has its own temperature characteristic curve. At high temperature, the dark current grows almost exponentially. A larger photosensor has a greater dark current, and its manufacturing parameters or materials also affects the dark current characteristic of the photosensor. It is obvious that the photosensor should be calibrated before being used. The temperature characteristic curve can be used to correct the electrical signal at different temperature.

If using two similar photodiodes, for the dark current and the ambient light respectively, the device will be difficult to miniaturize. In addition, it is impossible to mirror an identical dark current because the little deviation of the current mirror circuit, which distorts the correction accuracy for small signal, i.e. it cannot operate well in an environment of low luminance.

If the photodiode measuring the dark current is relatively small, the measured dark current needs to be amplified for approaching the dark current signal of that sensing the light. The size and manufacturing process affect the temperature characteristics curve to have different amplification rate, i.e. varying with temperature, for different photosensor. It very needs to consider the correction efficiency.

The present invention provides a quick and high accuracy dark current calibration for a small photosensor to improve light sensing quality.

SUMMARY OF THE INVENTION

The present invention provides a photosensor device, comprising:
- a first photodiode without being illuminated connected to a first switch-cap circuit, wherein the first photodiode is configured to measure a dark current and the first switch-cap circuit is used to convert the dark current to a first voltage;
- at least one second photodiode with being illuminated connected to a second switch-cap circuit, wherein the second photodiode is configured to sense a light to generate a sensing current, and the second switch-cap circuit is used to convert the sensing current to a second voltage;
- a programmable gain amplifier electrically connected to the first switch-cap circuit and the second switch-cap circuit;
- a temperature tracking table unit for storing a dark current temperature gain table; and
- a micro-processing unit connected to the temperature tracking table unit, the first switch-cap circuit, and the second switch-cap circuit, wherein the micro-processing unit generates a control signal of the first switch-cap circuit and the second switch-cap circuit according to the temperature tracking unit, and the control signal generates an output voltage ($V_{OUT}$).

The micro-processing unit generates the control signal of the first switch-cap circuit and the second switch-cap circuit according to the ambient temperature and the temperature tracking unit.

Below, embodiments accompanied with the attached drawings are employed to explain the objectives, technical contents, characteristics and accomplishments of the present invention.

DESCRIPTION OF THE PREFERRED EMBODIMENTS

Below embodiments accompanied with drawings are used to explain the spirit of this invention to have better understanding for the person in this art, not used to limit the scope of this invention, which is defined by the claims of this patent application. The applicant emphasizes the element quantity and size are schematic only. Moreover, some parts might be omitted to skeletally represent this invention for conciseness.

The photosensor device of the present invention comprises an ambient light sensing unit and a dark current measuring unit. The former senses an ambient light and the latter measures the dark current. In practice, photodiodes are used as the ambient light sensing unit and the dark current measuring unit. One for sensing ambient light is larger, and the other for measuring the dark current is smaller.

The dark current of the larger photodiode is larger than that of the smaller photodiode, and the ratio, called the magnification or gain value, changes with temperature to form gain temperature characteristic curve. The measured current of the dark-current-measured photodiode is multiplied by the gain value at a temperature to get a dark current of the ambient-light-sensed photodiode at that temperature. The current of the ambient-light-sensed photodiode subtracts the dark current to obtain the correct light sensing signal.

(1) Capacitor(s) accumulates and converts a dark current into a voltage signal, and especially a small capacitor is used in this invention. The small capacitor has a fast and sensitive measurement and conversion. In one embodiment, it obtains a dark current voltage signal within 1 to 2 milliseconds (ms), and it can be used in a low-illuminance environment.

(2) The dark current voltage signal is converted into a voltage correction signal at that the ambient temperature according to a temperature tracking table. The temperature tracking table records the gain value at different temperatures.

(3) To substrate the dark current correction signal from the voltage signal of the sensing circuit can obtain a lux signal, better after amplification.

As mentioned above, it needs to obtain the ambient temperature and dark current first to get the gain value and generates the calibration voltage signal, called calibration mode. It enters operation mode (or normal mode) after calibration. A time interval between two operations is used as a judgement parameter for deciding to enter the calibration mode or not. It enters the calibration mode if the time interval is longer than a critical period, otherwise stays in the operation mode.

The following embodiments combined with the drawings illustrates the technical means for eliminating dark current signals in the operating mode.

Figure 1:
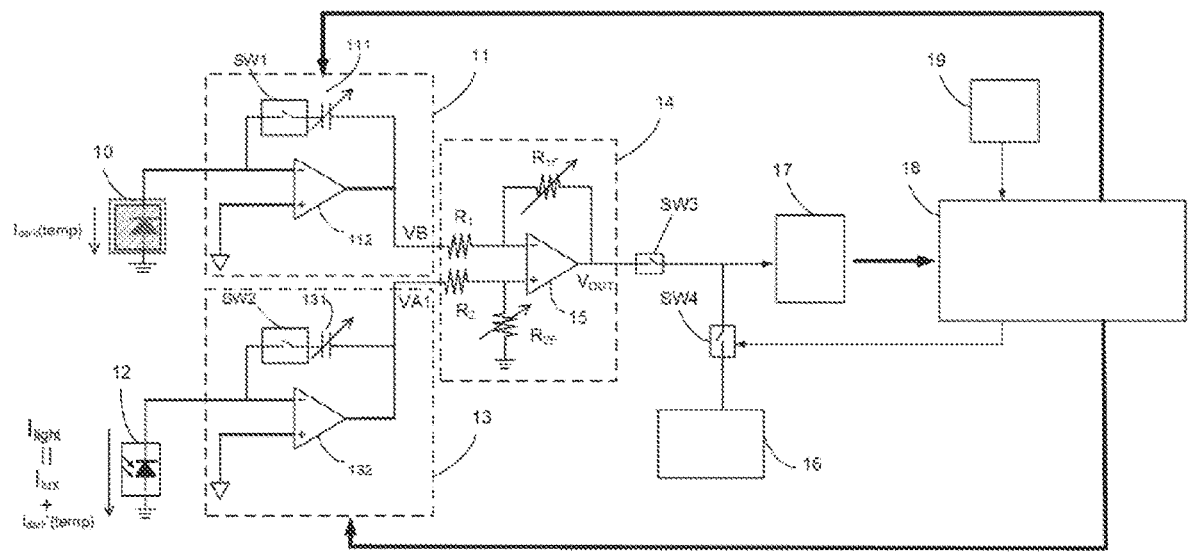
FIG. 1 is a circuit configuration diagram of the photosensor device of the present invention.

FIG. 1 schematically shows a circuit embodiment of the photosensor device of the present invention. The circuit comprises a first photodiode 10, a first switch-cap circuit 11, a second photodiode 12, a second switch-cap circuit 13, a programmable gain amplifier 14, a temperature sensing unit 16, a micro-processing unit 18 and a temperature tracking unit 19 that is configured to provide the temperature tracking table.

The first photodiode 10 measures the dark current ($I_{dark}$). The first switch-cap circuit 11 comprises a first capacitor 111 (with capacitance $C_{111}$), a first switch unit SW1 and a first amplifier 112. The first photodiode 10 is connected to the negative input terminal of the first amplifier 112. The first capacitor 111 and the SW1 are connected in series across the negative input terminal and the output terminal of the first amplifier 112. The positive input terminal of the first amplifier 112 is connected to the reference terminal (a ground terminal in this embodiment). The first amplifier 112 make sure the circuit to stay in reverse bias to guarantee the device operates normally.

The second photodiode 12 senses ambient light and generates a current ($I_{light+dark}$). The second switch-cap circuit 13 comprises a second capacitor 131 (with capacitance $C_{131}$), a second switch unit SW2 and a second amplifier 132. The second photodiode 12 is connected to the negative input terminal of the second amplifier 132. The second capacitor 131 and the SW2 are connected in series across the negative input terminal and the output terminal of the second amplifier 132. The positive input terminal of the second amplifier 132 is connected to the reference terminal (the ground terminal in this embodiment). The following formula is to show the output voltages:

$$V_B = I_{dark} * (T_{INT}/C_{111}) \quad (1)$$

$$V_{A1} = I_{light} * (T'_{INT}/C_{131}) + I_{dark} * (T'_{INT}/C_{131}) \quad (2)$$

The sensing current ($I_{light}$+dark) of the sensing element comprises the photocurrent ($I_{light}$) of the sensing element and the dark current ($I_{dark'}$) of the sensing element, that is, $I_{light+dark} = I_{light} + I_{dark}$. The dark current voltage is $V_{dark'} = I_{dark'} * (T'_{INT}/C_{131})$, and the light voltage signal is $V_{light}$ ($I_{light} * T'_{INT}/C_{131}$), wherein $T_{INT}$ and $T'_{INT}$ are respectively cumulative times of the light current and the dark current. From the temperature tracking table unit 19, the gain value is $\alpha(Temp) = I_{dark'}/I_{dark}$ at a specific temperature. The measured dark current voltage ($V_B$) can be converted into a dark current calibration voltage ($V_{dark}$), i.e. let $V_B = V_{dark'}$. Therefore, the voltage ($V_{a1} = V_{light} + V_{dark}$) subtracts the dark current calibration voltage ($V_{dark'}$) to obtain the light voltage signal ($V_{light}$).

There are many ways to convert the measured dark current voltage ($V_B$) into dark current calibration voltage ($V_{dark}$), which are described as follows:

First, let $T_{INT} = T'_{INT}$, and the first capacitor 111 (with $C_{111}$) and the second capacitor 131 (with $C_{131}$) are implemented by variable capacitors. The micro-processing unit 18 is configured to adjust the capacitance ratio ($C_{111}/C_{131}$) according to the gain value $\alpha(Temp)$ of the temperature tracking table unit 19.

Second, let the first capacitance $C_{111}$ = the second capacitance $C_{131}$. The micro-processing unit 18 is configured to adjust the switching frequency of the SW1 and the SW2 according to the gain value $\alpha(Temp)$ of the temperature tracking table unit 19.

Third, let the first capacitance $C_{111}$ equal to the second capacitance $C_{131}$, and the switching frequency of the SW1 equal to the switching frequency of the SW2. The micro-processing unit 18 is configured to adjust the cycle ratio of the SW1 and the SW2 according to the gain value $\alpha(Temp)$ of the temperature tracking table unit 19.

The first switch-cap circuit 11 and the second switch-cap circuit 13 are connected to the programmable gain amplifier 14, which amplifies the light voltage signal ($V_{light}$) to an output voltage ($V_{OUT}$). The ratio ($V_{OUT}/V_{light}$) is the gain (or called magnification) of the programmable gain amplifier 14.

In one embodiment, the programmable gain amplifier 14 comprises a third amplifier 15, a negative source terminal resistor $R_1$, a negative reference resistor $R_{1F}$, a positive source resistor $R_2$, and a positive reference resistor $R_{2F}$. The negative source resistor $R_1$ is connected between the first switch-cap circuit 11 and a negative input terminal of the third amplifier 15, and the positive source resistor $R_2$ is connected between the second switch-cap circuit 13 and a positive input terminal of the third amplifier 15. The negative reference resistor $R_{1F}$ is connected across the negative input terminal and the output terminal of the third amplifier 15, and the positive reference resistor $R_{2F}$ is connected to the positive input terminal and the reference terminal (the ground terminal in this embodiment).

The resistances of the negative source resistor R1 and the positive source resistor $R_2$ can be the same or different, and the resistances of the negative reference resistor $R_{1F}$ and the positive reference resistor $R_{2F}$ can be the same or different also. In this embodiment, the negative source resistor $R_1$ and the positive source resistor $R_2$ have the same resistance value ($R_S$), and the negative reference resistor $R_{1F}$ and the positive reference resistor $R_{2F}$ also have the same resistance value ($R_F$), so the gain value of the programmable gain amplifier 14 (that is, the gain value of the third amplifier 15) is equal to $R_F/R_S$, i.e. $V_{OUT} = (R_F/R_S) * (V_A - V_B)$. Furthermore, the negative reference resistor $R_{1F}$ and the positive reference resistor $R_{2F}$ can be implemented by variable resistors, and the gain value of the programmable gain amplifier 14 can be adjusted.

Figure 2:
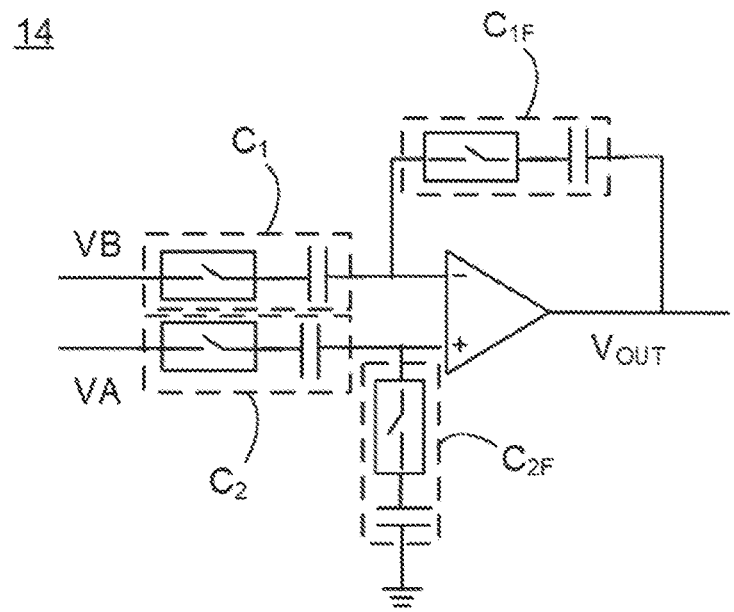
FIG. 2 is a circuit configuration diagram of the programmable gain amplifier of another embodiment of FIG. 1.

In another embodiment, the programmable gain amplifier 14 comprises a third amplifier 15, a negative source terminal switched capacitor $C_1$, a negative reference switched capacitor $C_{1F}$, a positive source terminal switched capacitor $C_2$, and a positive reference switched capacitor $C_{2F}$. The connection relationship is the same as that of the above-mentioned embodiment, except that the resistor is replaced by capacitors, as shown in FIG. 2.

As the previous embodiment, the capacitances of the negative source terminal switched capacitor $C_1$ and the positive source terminal switched capacitor $C_2$ can be the same or different, and the capacitances of the negative reference switched capacitor $C_{1F}$ and the positive reference switched capacitor $C_{2F}$ can be the same or different. In one embodiment, the negative source terminal switched capacitor $C_1$ and the positive source terminal switched capacitor $C_2$ have the same capacitance ($C_S$), and the negative reference switched capacitor $C_{1F}$ and the positive reference switched capacitor $C_{2F}$ also have the same capacitance ($C_F$), so the gain value of the programmable gain amplifier 14 (that is, the gain value of the third amplifier 15) is equal to $C_S/C_F$, that is, $V_{OUT}=(C_S/C_F)*(V_A-V_B)$.

The environment may be in color shift, so the system may use color casts to adapt the different environment. Therefore, in an embodiment, a plurality of second photodiodes 12 and second switch-cap circuits 13 are used for different color-dish environment, and the output voltage is $V_{OUT}(\text{Temp})=(V_{A1}(\text{Temp})+ \ldots +V_{AX}(\text{Temp})-V_B(\text{Temp}))*(R_{XF}/R_X)$. In one case, many in-parallel same circuits are used to eliminate the dark current caused by all photodiodes at the same time, or to sequentially eliminate the dark current caused by each photodiode by multiplexing.

The following explains how the system switched between the operation mode and the calibration mode:

In one embodiment FIG. 1, it further comprises a third switch unit SW3 coupled between the programmable gain amplifier 14 and an analog-to-digital converter (ADC) 17. A fourth switch unit SW4 coupled between the temperature sensing unit 16 and the ADC 17. When the SW3 is switched to close, the output voltage ($V_{OUT}$) of the programmable gain amplifier 14 is converted by the ADC 17, and then to the micro-processing unit 18. When the SW4 is switched to close, the ambient temperature can be measured.

The micro-processing unit 18 comprises a processor and a finite state machine (FSM). The ADC 17 generates and inputs a set digital signals to the micro-processing unit 18 according to the output voltage ($V_{OUT}$) and the measured temperature of the temperature sensing unit 16. The micro-processing unit 18 queries the temperature tracking table unit 19 a temperature gain value, then generates and stores a control signal in the finite state machine to finish the calibration, and then switches to the operation mode.

The photosensor device enters the calibration mode or not according to a time interval or a time period between two operations. As mentioned above, the calibration of the present invention only needs 1 to 2 milliseconds, and user will not feel the calibration process.

The micro-processing unit 18 is configurable to control the SW1, the SW2, the SW3 and the SW4 to switch to the calibration mode or the operation mode.

When entering the calibration mode, the SW2 is switched to open, and the SW1, the SW3 and the SW4 are controlled by the micro-processing unit 18.

When entering the operation mode, the SW3 and the SW4 are switched to open, and the SW1 and the SW2 are controlled by the micro-processing unit 18.

Figure 3:
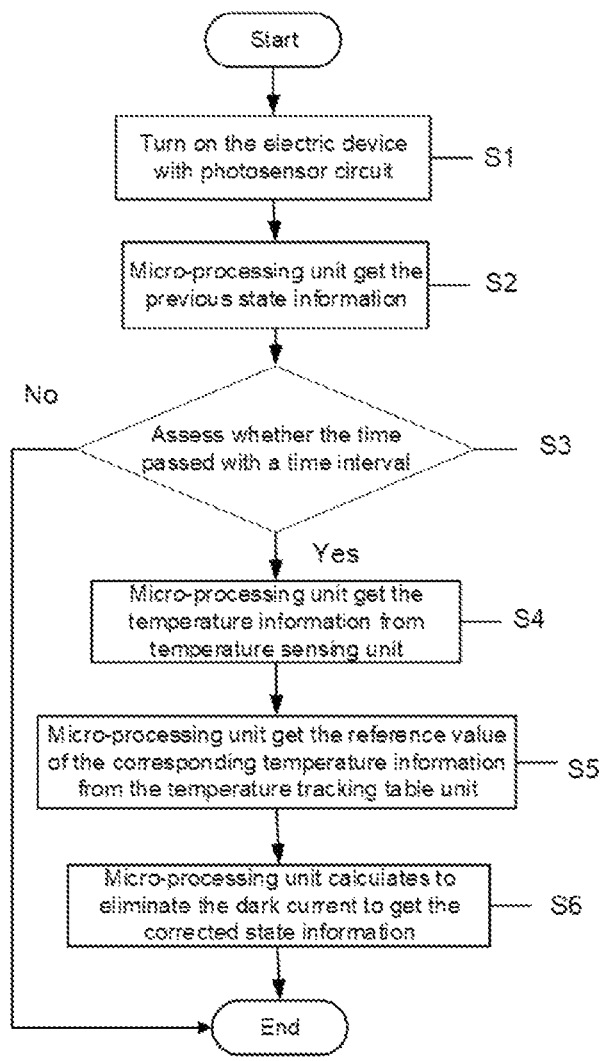
FIG. 3 is an operation flowchart of the photosensor device of the present invention.

Refer to the embodiment shown in FIG. 3. When starting the system, the photosensor circuit senses ambient light (step S1), and the micro-processing unit 18 can access the control signal from the built-in memory (used as the finite state machine (FSM)) (step S2) to calculate the time interval for determining whether to enter calibration mode or not (step S3), such as to judge the time interval is longer than 10 seconds or not, if yes, enter the calibration mode, otherwise no calibration is performed.

In the calibration step, the micro-processing unit 18 obtains the temperature information by the temperature sensing unit 16 (step S4), obtains a reference value (temperature gain) from the temperature tracking table unit 19 (step S5), and obtains the corrected state information (i.e. to generates calibration signal for eliminating the dark current) (step S6).

Figure 4:
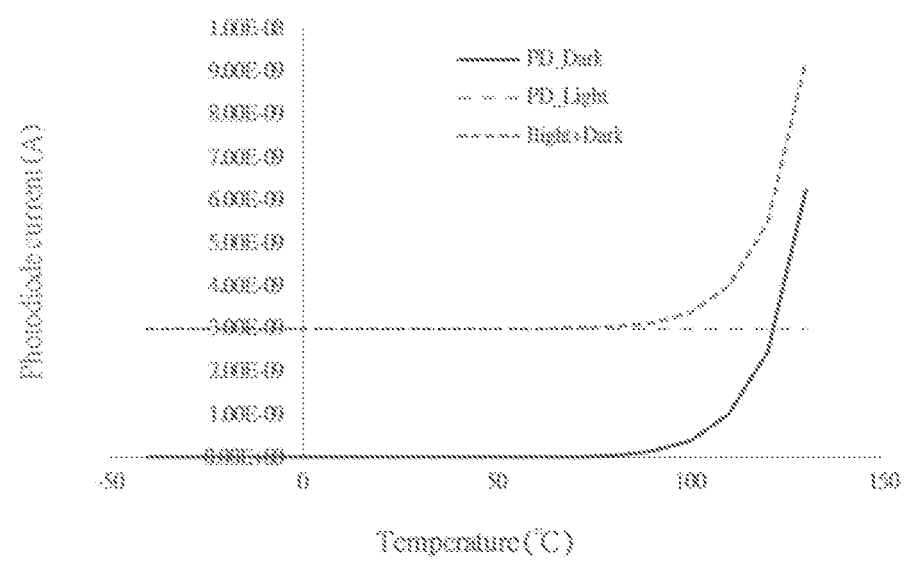
FIG. 4 is a graph showing the relationship between the dark current generated by the photodiode of the present invention and the ambient temperature.

FIG. 4 illustrates the temperature characteristic curve of the dark current, which is used to make a temperature tracking table.

The area of the second photodiode 12 for sensing ambient light is larger than that of the first photodiode 10 for measuring dark current.

The dark current (noted as I_dark) of the first photodiode only contains dark current, because the first photodiode 10 is not illuminated by light. At low temperatures, the dark current approaches zero, and at high temperatures, the dark current grows exponentially with temperature.

The total current (noted as I_light+dark) of the second photodiode includes light current (noted as I_light) and I_dark. At low temperatures, since the I_dark approaches zero, the I_light+dark is very close to the I_light. At high temperatures, the I_dark grows exponentially with temperature and mixed into the sensing current, thus the I_light+dark also grows exponentially with temperature. Understandably, at high temperatures, the dark current is greater than the light current, so the current is very distorted and not useful in the environment with high temperature and low illumination without calibration.

The ratio of the dark current of the second photodiode to the dark current of the first photodiode varies with the temperature. The ratio changes little at extreme temperatures but more drastically in the middle temperature range, so the calibration efficiency of the dark current with temperature is very important. The photosensor device proposed here can calibrate the dark current within 1 to 2 milliseconds, and it is very suitable and useful in a low-illuminance environment.

What is claimed is:

1. A photosensor device, comprising:
   a first photodiode without being illuminated connected to a first switch-cap circuit comprising a first amplifier, a first switch unit, and a first capacitor, wherein the first photodiode is configured to measure a dark current and the first switch-cap circuit is used to convert the dark current to a first voltage;
   at least one second photodiode with being illuminated connected to a second switch-cap circuit comprising a second amplifier, a second switch unit, and a second capacitor, wherein the second photodiode is configured to sense a light to generate a sensing current, and the second switch-cap circuit is used to convert the sensing current to a second voltage;
   a programmable gain amplifier electrically connected to the first switch-cap circuit and the second switch-cap circuit;
   a temperature tracking table unit for storing a dark current temperature gain table; and
   a micro-processing unit connected to the temperature tracking table unit, the first switch-cap circuit, and the second switch-cap circuit, wherein the micro-processing unit generates a control signal used to control switching of the first switch unit and the second switch unit to generate an output voltage ($V_{OUT}$) according to the temperature tracking unit, and both of the first capacitor and the second capacitor are small capacitors, which are saturated within 1-2 milliseconds.

2. The photosensor device according to claim 1, wherein the micro-processing unit comprises:
- a finite state machine configured to store the control signal; and
- a processor connected to the finite state machine to control the switching of the first switch unit and the second switch unit by using the control signal.

3. The photosensor device according to claim 2, wherein the finite state machine is a built-in memory.

4. The photosensor device according to claim 1, wherein the first capacitor and the second capacitor are variable capacitors and controlled by the micro-processing unit to adjust their capacitance respectively.

5. The photosensor device according to claim 1, wherein the first switch unit and the second first switch unit are controlled by the micro-processing unit to adjust the switching frequencies.

6. The photosensor device according to claim 1, wherein the first switch unit and the second switch unit are controlled by the micro-processing unit to adjust their cycle ratio.

7. The photosensor device according to claim 1, further comprising:
- an analog-to-digital converter connected to the micro-processing unit;
- a third switch unit connected between the programmable gain amplifier and the analog-to-digital converter; and
- a fourth switch unit connected between a temperature sensing unit and the analog-to-digital converter.

8. The photosensor device according to claim 7, wherein the micro-processing unit enters into a calibration mode to start a calibration procedure according to a time interval, and switches to an operation mode when finishing the calibration procedure.

9. The photosensor device according to claim 7, wherein
- the photosensor device enters a calibration mode when the second switch unit is switched to open, the micro-processing unit controls the third switch unit and the fourth switch unit to switch; and
- the photosensor device enters an operation mode when the third switch unit and the fourth switch unit are switched to open.

10. The photosensor device according to claim 1, wherein the programmable gain amplifier comprises:
- a third amplifier with a negative input terminal, a positive input terminal and an output terminal;
- a negative source terminal resistor and a negative reference resistor, wherein the negative source terminal resistor is connected between the negative input terminal and the first switch-cap circuit, and the negative reference resistor is connected across the negative input terminal and the output terminal; and
- a positive source terminal resistor and a positive reference resistor, wherein the positive source terminal resistor is connected between the positive input terminal and the second switch-cap circuit, the positive reference resistor is connected between the positive input terminal and a ground terminal; wherein
- the negative source terminal resistor and the positive source terminal resistor have a same resistance value, and the negative reference resistor and the positive reference resistor have a same resistance value.

11. The photosensor device according to claim 1, wherein the programmable gain amplifier comprises:
- a third amplifier with a negative input terminal, a positive input terminal and an output terminal;
- a negative source terminal switched capacitor and a negative reference switched capacitor, wherein the negative source terminal switched capacitor is connected between the negative input terminal and the first switch-cap circuit, and the negative reference switched capacitor is connected across the negative input terminal and the output terminal; and
- a positive source terminal switched capacitor and a positive reference switched capacitor, wherein the positive source terminal switched capacitor is connected between the positive input terminal and the second switch-cap circuit, and the positive reference switched capacitor is connected between the positive input terminal and a ground terminal; wherein
- the negative source terminal switched capacitor and the positive source terminal switched capacitor have a same capacitance value, and the negative reference switched capacitor and the positive reference switched capacitor have a same capacitance value.

12. The photosensor device according to claim 1, wherein the second photodiode is larger than the first photodiode.

* * * * *